United States Patent [19]

Ota et al.

[11] Patent Number: 5,230,157

[45] Date of Patent: Jul. 27, 1993

[54] TOUCH LEVER CLOSING MECHANISM

[75] Inventors: Yasunori Ota; Yuji Kubota, both of Tokyo, Japan

[73] Assignee: Ando Electric Co., Ltd., Tokyo, Japan

[21] Appl. No.: 838,358

[22] Filed: Feb. 19, 1992

[30] Foreign Application Priority Data

Mar. 13, 1991 [JP] Japan .................... 3-074024

[51] Int. Cl.$^5$ .............................. G01B 5/20
[52] U.S. Cl. ........................ 33/550; 33/552; 33/549; 33/555.1; 33/568
[58] Field of Search .............. 33/783, 805, 803, 832, 33/549, 550, 552, 555.1, 555.3, 568, 572, 573

[56] References Cited

U.S. PATENT DOCUMENTS

| | | | |
|---|---|---|---|
| 3,350,785 | 11/1967 | Rawstron et al. | 33/549 |
| 4,064,633 | 12/1977 | Wertepny | 33/555.3 |
| 5,024,002 | 6/1991 | Possati | 33/549 |
| 5,044,088 | 9/1991 | Peucker | 33/550 |

Primary Examiner—William A. Cuchlinski, Jr.
Assistant Examiner—William C. Dowling
Attorney, Agent, or Firm—Flynn, Thiel, Boutell & Tanis

[57] ABSTRACT

A touch lever closing mechanism does not employ an actuator and a sensor but employs first and second touch levers provided with first and second arms and a shaft for opening and closing the first and second arms. The touch lever closing mechanism comprises first and second position detectors which are provided with the first and second touch levers and disposed at the side of a fixed receiver wherein a work is clamped by the first and second touch levers and the outer diameter of the work is measured based on the position where the work is clamped by the first and second touch levers, characterized in that the first touch lever has the first arm which is attached thereto and forms an inversed T-shape together with the first arm, the first touch lever is connected to a connecting bar of the first position detector, the second touch lever has the second arm which is attached thereto and forms an inversed T-shape together with the second arm, the second touch lever is connected to the connecting bar of the second position detector, the shaft disposed under the first and second arms and in parallel with the work and a spring attached to the fixed receiver for raising the shaft.

1 Claim, 4 Drawing Sheets

TOUCH LEVER CLOSING MECHANISM

BACKGROUND OF THE INVENTION

1. Field of the Invention

The present invention relates to a touch lever closing mechanism of a touch lever type dimensions measuring apparatus.

2. Prior Art

An arrangement of a conventional touch lever type dimensions measuring apparatus will be described with reference to FIG. 5.

Designated at 2 is a fixed receiver having a V-shaped recess (hereinafter referred to as a V-recessed receiver), 3A and 3B are position detectors, 9 is a work outer diameter of which is measured, 10A and 10B are touch levers, 11 is actuators and 12 is a sensor. The work 9 is conveyed between the two touch levers 10A and 10B so that the touch levers 10A and 10B clamp the work 9 and measure the outer diameter of the work 9. If the work 9 is formed of a soft material such as aluminium, the work 9 is abraded by the touch levers 10A and 10B when the work 9 is put on the fixed V-recessed receiver 2, whereby the work 9 is liable to be damaged. To prevent such damage, the touch levers 10A and 10B should be opened before the work 9 is put on the fixed V-recessed receiver 2.

An operation of the actuators 11 will be described with reference to FIGS. 6 and 7.

Designated at 5 is connecting bars, 13 is fulcrums. FIG. 6 shows the operation of the actuators 11 before the work 9 is put on the fixed V-recessed receiver 2. The actuators 11 are operated so that the touch levers 10A and 10B are opened. When the actuators 11 move in the direction of the arrow, the touch levers 10A and 10B, which are connected to the connecting bars 5, are turned about the fulcrums 13 and are opened outside.

When the work 9 is put on the fixed V-recessed receiver 2, as illustrated in FIG. 5, the sensor 12 detects the work 9 and issues a signal instructing to close the touch levers 10A and 10B. The actuators 11 are driven, upon reception of the signal from the sensor 12, to close the touch levers 10A and 10B. Accordingly, the touch levers 10A and 10B clamp the work 9 so that the outer diameter of the work 9 is measured by the position detectors 3A and 3B. The position detectors 3A and 3B are of each differential transformer type.

The conventional touch lever closing mechanism requires the actuators 11 for opening and closing the touch levers 10A and 10B and also requires an electric sequential control for supplying the signal from the sensor 12 to the actuators 11 when the sensor 12 detected the work 9.

SUMMARY OF THE INVENTION

It is an object of the present invention to provide a touch lever closing mechanism of a touch lever type dimensions measuring apparatus which does not include an actuator and a sensor, which have been employed by the conventional touch lever closing mechanism, but include touch levers provided with arms and a shaft for opening and closing the arms and capable of measuring the dimensions of a work without damaging the work.

To achieve the object of the present invention, the touch lever closing mechanism of a touch lever type dimensions measuring apparatus comprises a movable receiver 1 having a V-shaped recess on which a work 9 is put and conveyed, a fixed receiver 2 having a V-shaped recess on which the work 9 is put by the movable receiver 1, first and second position detectors 3A and 3B which are provided with first and second touch levers 6A and 6B and disposed at the side of the fixed receiver 2 wherein the work 9 is clamped by the first and second touch levers 6A and 6B and the outer diameter of the work 9 is measured based on the position where the work 9 is clamped by the first and second touch levers 6A and 6B, characterized in that the first touch lever 6A has a first arm 4A which is attached thereto and forms an inversed T-shape together with the first arm 4A, the first touch lever 6A is connected to a connecting bar 5 of the first position detector 3A, the second touch lever 6B has a second arm 4B which is attached thereto and forms an inversed T-shape together with the second arm 4B, the second touch lever 6B is connected to the connecting bar 5 of the second position detector 3B, a shaft 7 disposed under the first and second arms 4A, 4B and in parallel with the work 9 and a spring 8 coupled between the fixed receiver 2 and the shaft 7 for raising the shaft 7, whereby the shaft 7 contacts the first and second arms 4A and 4B to thereby open the first and second arms 4A and 4B when the work 9 is not put on the fixed receiver 2 while the shaft 7 contacts the movable receiver 1 and lowered by the movable receiver 1 and moved away from the first and second arms 4A and 4B to thereby close the first and second arms 4A and 4B when the work 9 is put on the fixed receiver 2 so that the first and second touch levers 6A and 6B touch the work 9.

PREFERRED EMBODIMENT OF THE INVENTION

Figure 1:
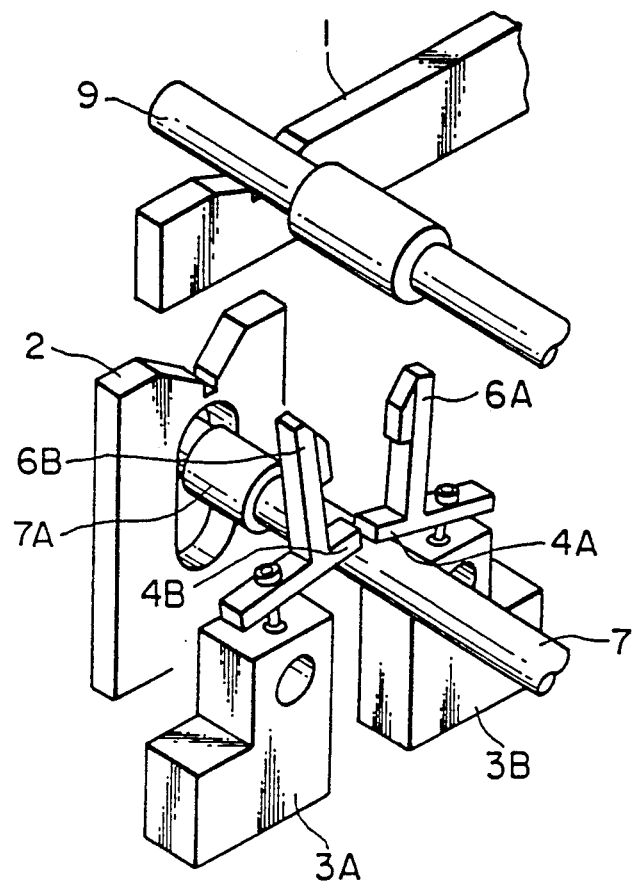
FIG. 1 is a view showing an arrangement of a touch lever mechanism of a touch lever type dimensions measuring apparatus.

A touch lever closing mechanism according to a preferred embodiment of the present invention will be described with reference to FIGS. 1 to 4.

The touch lever closing mechanism comprises a movable receiver 1 having a V-shaped recess for receiving a work 9, touch levers 6A and 6B which are respectively of inversed T-shape and disposed in confronted relation and provided with arms 4A and 4B, position detector 3A and 3B which are connected to the touch levers 6A and 6B by way of connecting bars 5, fixed receivers 2 each provided with a V-shaped recess for receiving the work 9 and a hole 2A, and a shaft 7 which is disposed in parallel with the work 9 under the arms 4A and 4B and inserted into the holes 2A of the fixed receivers 2 and suspended in the holes 2A by springs 8.

Figure 2:
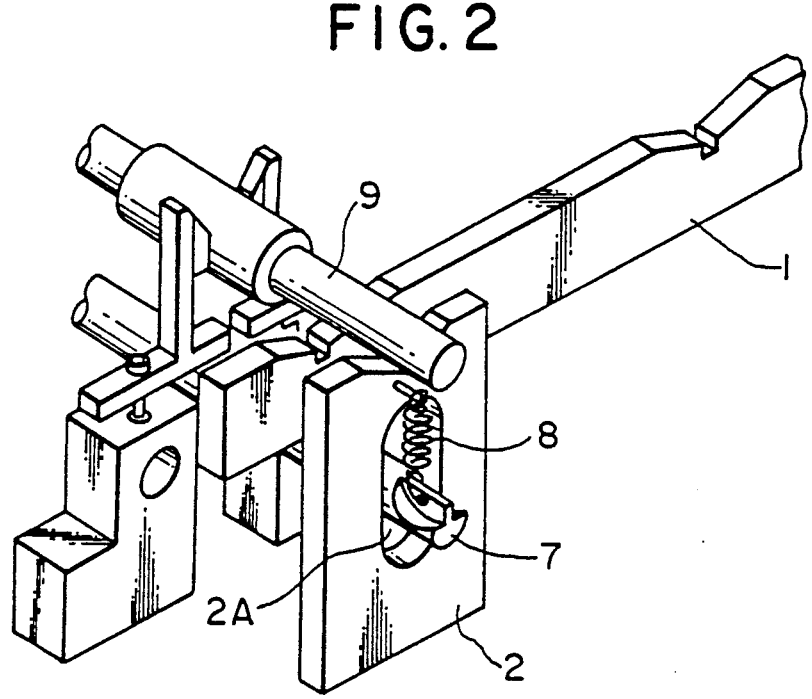
FIG. 2 is a view showing the state where a work is put on a fixed V-recessed receiver, a constituent of the touch lever mechanism in FIG. 1.
Figure 3:
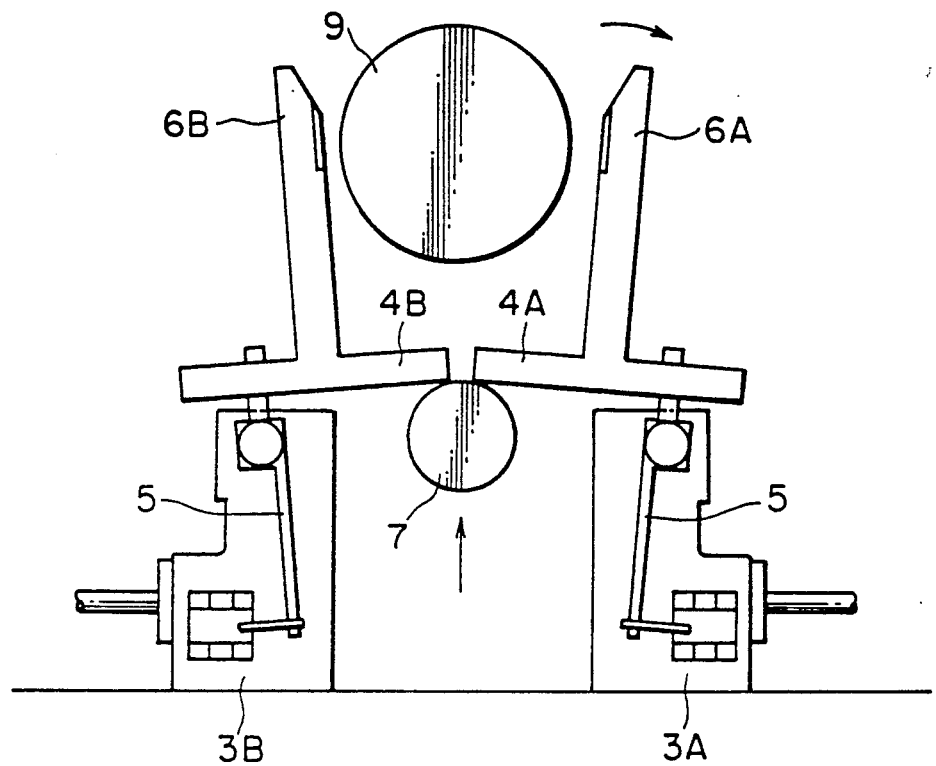
FIG. 3 is a side view of the arrangement of FIG. 1.
Figure 4:
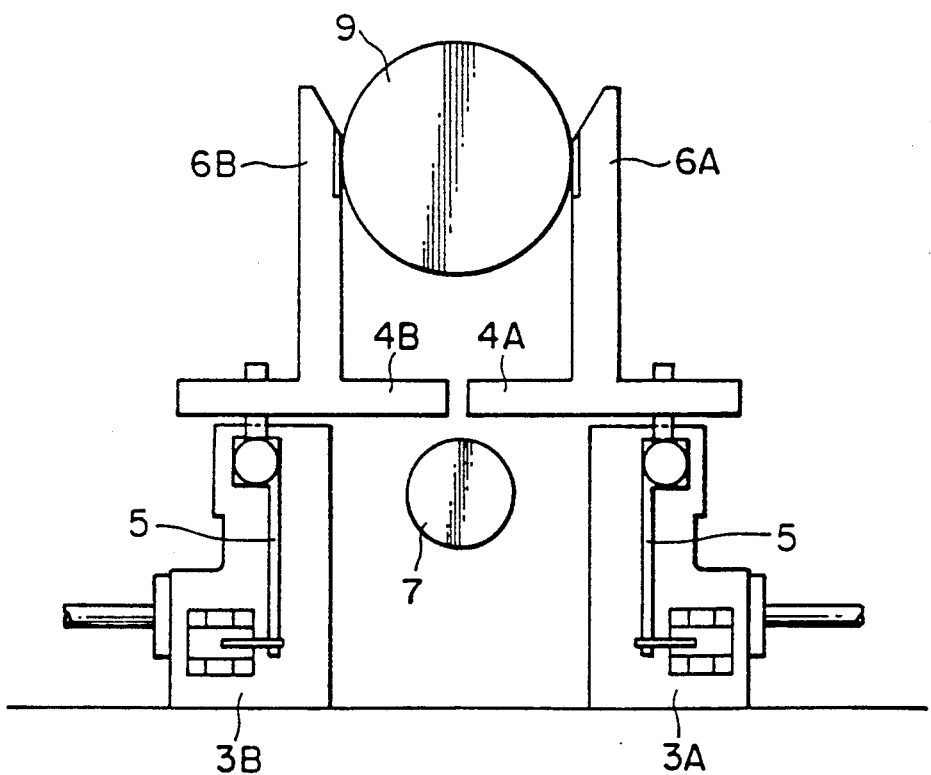
FIG. 4 is a side view of the arrangement of FIG. 2.
Figure 5:
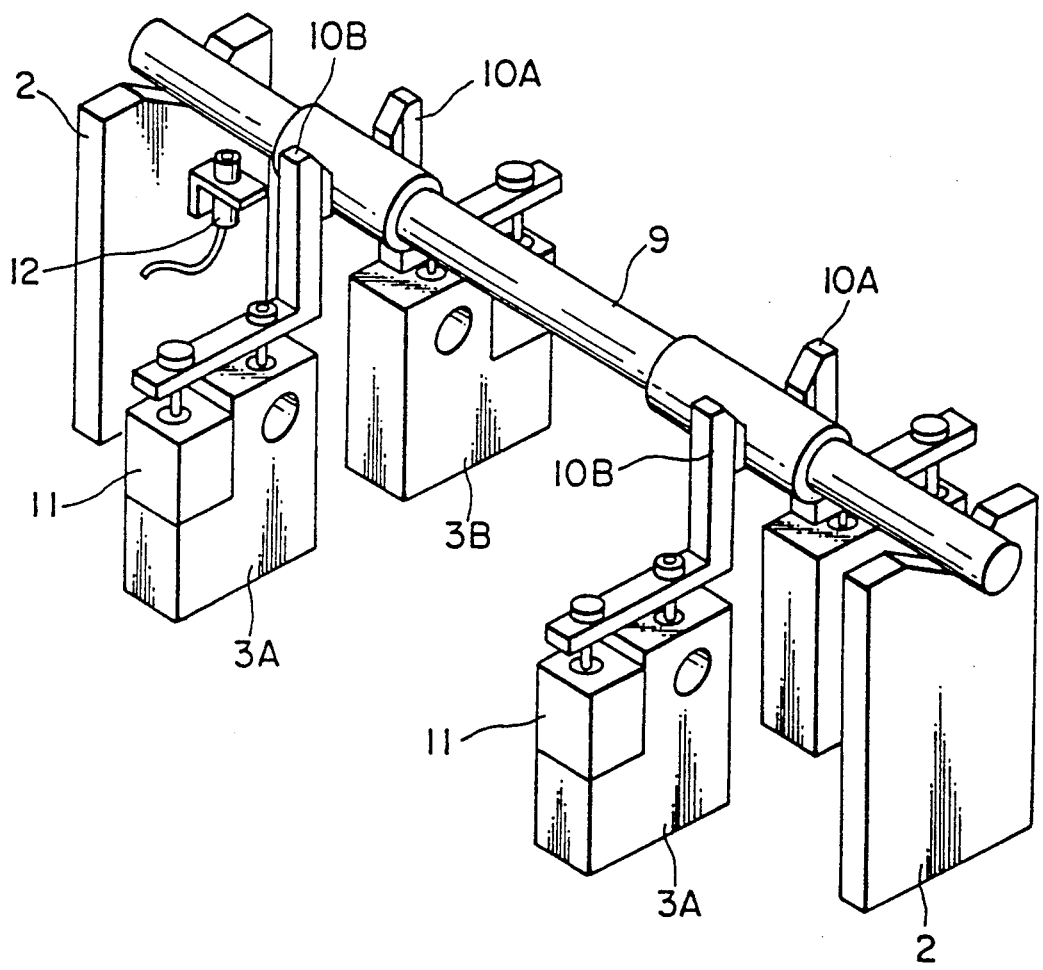
FIG. 5 is a view showing an arrangement of a conventional touch lever mechanism.
Figure 6:
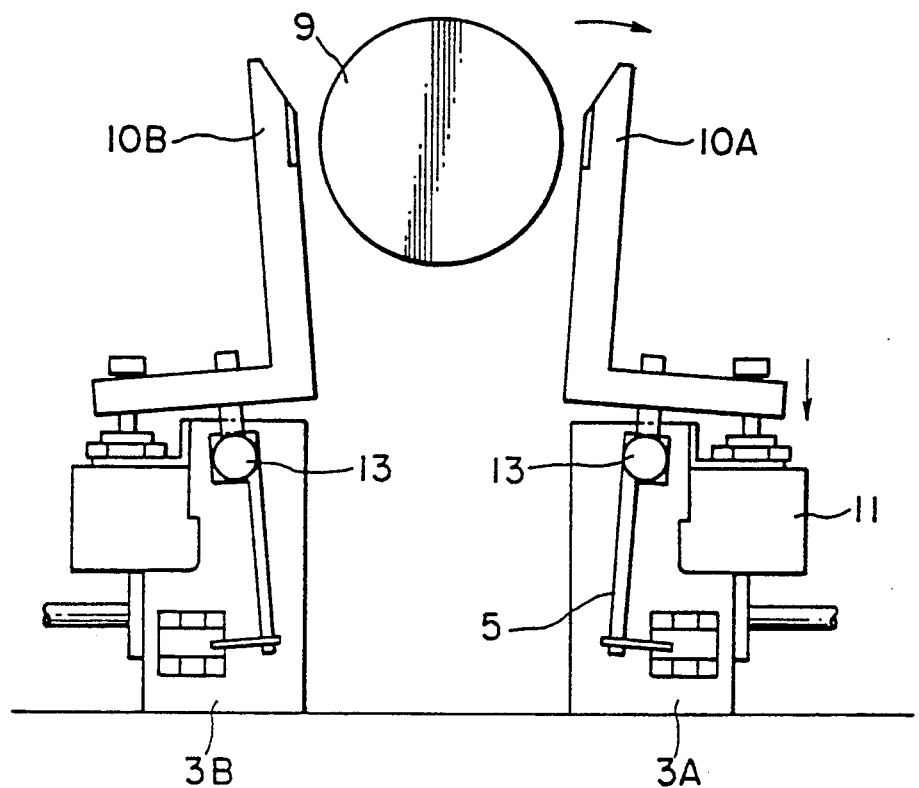
FIG. 6 is a side view of a main portion of the arrangement in FIG. 5, wherein a work is not put on a fixed V-recessed receiver.
Figure 7:
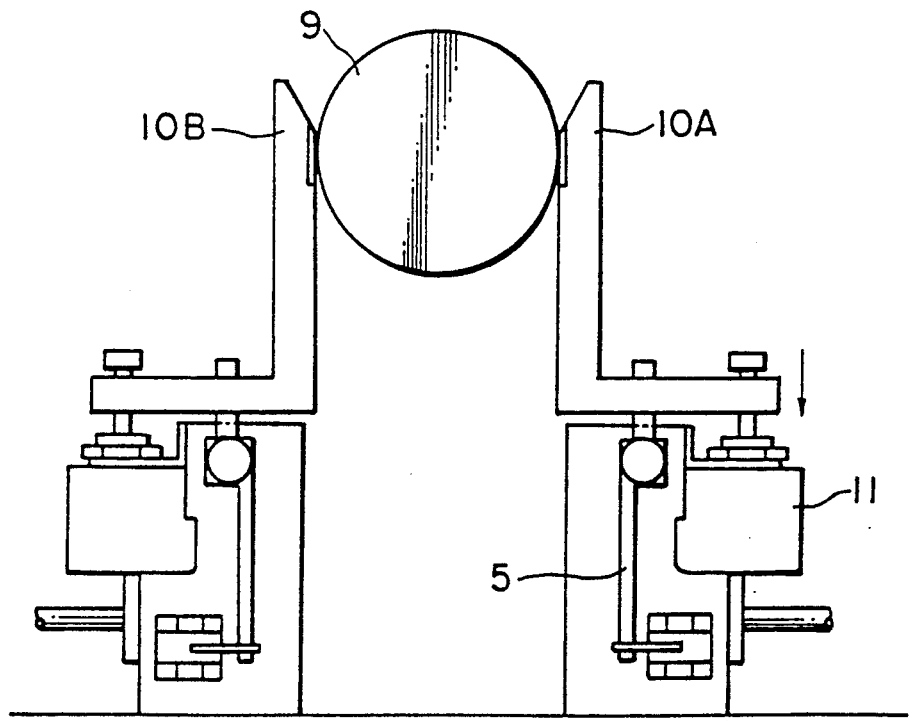
FIG. 7 is a side view of the main portion of the arrangement in FIG. 5, wherein the work is put on the fixed V-recessed receiver.

The work 9 is not put on the fixed receivers 2 in FIGS. 1 and 3 but put on the fixed receivers 2 in FIGS. 2 and 4.

In FIG. 3, the shaft 7 is raised upward by the springs 8 and contacts the arms 4A and 4B at the upper periphery thereof, thereby opening the arms 4A and 4B. When arms 4A and 4B are open, touch levers 6A and 6B move outward away from each other and release work 9.

In FIGS. 2 and 4, the movable receiver 1 contacts the shaft 7 to thereby lower the shaft 7 so that the shaft 7 is moved away from the arms 4A and 4B. As a result, the touch levers 6A and 6B are closed to thereby touch the work 9. The position where the touch levers 6A and 6B touch the work 9 can be detected by the position detectors 3A and 3B, whereby the outer diameter of the work 9 can be measured. The shaft 7 has a roller 7A which is wound therearound and disposed at the portion where it contacts the periphery of the holes 2a of the fixed receivers 2 and performs rolling contact with the periphery of the holes 2A. The shaft 7 moves vertically in the holes 2A of the fixed receivers 2 at a specific stroke or interval. An upper limit of movement of the shaft 7 is determined by the holes 2A and set to be the height where the touch levers 6A and 6B starts to open. The upper limit of the movement of the roller 7A of the shaft 7 is set not to contact the movable receiver 1 until the movable receiver 1 conveys the work 9 on the fixed receiver 2. A lower limit of the movement of the shaft 7 is determined by the movement of the movable receiver 1, namely, the shaft 7 is lowered until the movable receiver 1 lowers at its lowest end. At this time, the shaft 7 does neither contact the arms 4a and 4B nor contacts the lower ends of the holes 2A of the fixed receivers 2.

With the arrangement set forth above, it is possible to measure the dimensions of the work without damaging the work since the touch levers are provided with arms and the shaft which opens and closes the arms instead of the actuator and the sensor of the conventional touch lever closing mechanism.

What is claimed is:

1. A touch lever closing mechanism of a touch lever type dimensions measuring apparatus comprising a movable receiver having a V-shaped recess on which a work is put and conveyed, a fixed receiver having a V-shaped recess on which the work is put by the movable receiver, first and second position detectors which are provided with first and second touch levers and disposed at the side of the fixed receiver wherein the work is clamped by the first and second touch levers and the outer diameter of the work is measured based on the position where the work is clamped by the first and second touch levers, characterized in that the first touch lever has a first arm which is attached thereto, said first touch lever and said first arm together form an inversed T-shape, the first touch lever is connected to a connecting bar of the first position detector, the second touch lever has a second arm which is attached thereto, said second touch lever and said second arm together form an inversed T-shape, the second touch lever is connected to a connecting bar of the second position detector, a shaft disposed under the first and second arms and in parallel with the work and a spring coupled between the fixed receiver and the shaft for raising the shaft, whereby the shaft contacts the first and second arms to thereby open the first and second arms when the work is not put on the fixed receiver while the shaft contacts the movable receiver and is lowered by the movable receiver and moved away from the first and second arms to thereby close the first and second arms when the work is put on the fixed receiver so that the first and second touch levers touch the work.

* * * * *